United States Patent [19]

Tornquist

[11] 4,184,481
[45] Jan. 22, 1980

[54] DIRECTIONAL SELF-SUPPORTING PYRAMID SHAPED HOT WATER SOLAR ABSORBER

[76] Inventor: August Tornquist, 125 Barclay Ave., Staten Island, N.Y. 10312

[21] Appl. No.: 942,936

[22] Filed: Sep. 18, 1978

Related U.S. Application Data

[63] Continuation-in-part of Ser. No. 820,467, Aug. 1, 1977, abandoned.

[51] Int. Cl.² .............................................. F24J 3/02
[52] U.S. Cl. ................................. 126/422; 126/447; 126/450
[58] Field of Search .............. 126/270, 271; 237/1 A; 165/171, 172

[56] References Cited

U.S. PATENT DOCUMENTS

| | | | |
|---|---|---|---|
| 2,167,576 | 7/1939 | Kiser | 126/271 |
| 2,402,326 | 6/1946 | Harkness | 126/271 |
| 3,822,692 | 7/1974 | Demarest | 126/271 |
| 4,084,573 | 4/1978 | Shubert | 126/270 |
| 4,108,157 | 8/1978 | Gorniak | 126/271 |
| 4,132,221 | 1/1979 | Orillion | 126/271 |
| 4,149,525 | 4/1979 | Prado | 126/271 |

*Primary Examiner*—James C. Yeung
*Attorney, Agent, or Firm*—Gloria K. Koenig

[57] ABSTRACT

A solar absorber to be mounted on the roofs of buildings, the absorber having the form of a pyramid with the heat absorbing elements mounted across the upward extending faces of the pyramid and the base formed to conform to the contour of the roof so that the solar absorber may be fixedly mounted on the roof of a building.

In a modified form of my invention each face of the pyramid is independently equipped with a heat sensor which is electrically connected to a water valve and water circulator so that water circulates only through the faces exposed to sunlight.

10 Claims, 16 Drawing Figures

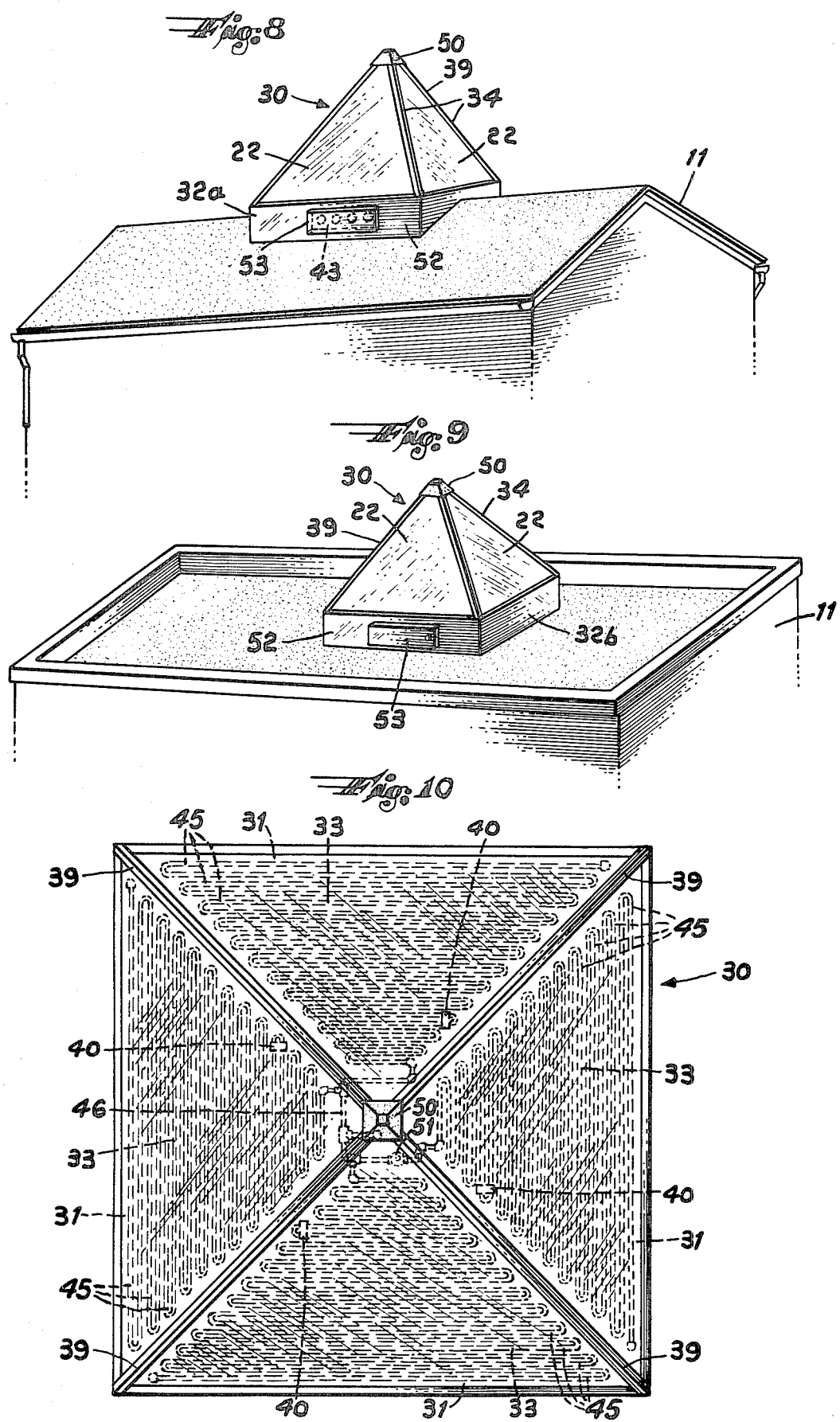

DIRECTIONAL SELF-SUPPORTING PYRAMID SHAPED HOT WATER SOLAR ABSORBER

CROSS REFERENCE

This application is a continuation in part of pending application Ser. No. 820,467 filed Aug. 1, 1977, abandoned.

BACKGROUND OF THE INVENTION

(1) Field of the Invention

This invention is a solar absorber for use to heat hot water by means of the sun's rays and designed to be mounted on the roofs of buildings, the solar absorber elements being mounted in the form of a pyramid, with the base of the pyramid designed to conform to the contour of a roof. In the first form of my invention, finned copper absorbing elements are connected in series, with the absorber having one heat sensor electrically connected to one water valve and water circulator, with the cold water circulating around the entire absorber. In my modified absorber, the heat absorbing elements are pressed waterway bonded copper, aluminum or stainless steel or alternatively are made of copper tubing bonded to copper or aluminum heat transfer flat surfaces. Each panel is equipped with its own heat sensor which is electrically connected through a control panel to a zone water valve and to a water circulator, so that water is circulating through only those panels which are exposed to the sun.

(2) Description of the Prior Art

Most commercially available hot water solar absorbers available for home use are flat plate absorbers. However, in a majority of existing homes, flat bed absorbers are not adaptable to the roof angle or to the north-east-south-west orientation of the building. In homes where the ridge pole of the roof runs in a north-south direction, a conglomeration of odd angle brackets would be required to mount the flat bed absorbers in such a way as to be moderately effective in catching the sun's rays. Most solar contractors do not want to construct these ungainly types of arrangements and very few homeowners would consent to have such ugly structures on their roofs. Further, known types of solar absorbers do not permit the economical installation of these devices on a great many homes.

SUMMARY OF THE INVENTION

It is an object of this invention to provide a hot water solar absorber having an upper part shaped as a pyramid and a lower part or base made with either a flat surface for mounting on flat roofs or a wedged shaped base for mounting on peaked roofs.

The heat absorbing elements themselves are those which are well known in the art, the invention being the form, arrangement and connection of the known types of absorbing elements into the upward extending faces of a pyramid, thus providing a single fixed unit, in which one or more of the faces will take the sun's rays throughout the day. The pyramid, unlike a flat plate collector, will take the full morning sun at almost right angles to the east side. At midday the absorber will take the full sun on the west with angle absorption on the south and west. An exception would be in far northern latitudes where the noon sun would not strike the north side. It is therefore a further object of this invention to provide an all directional, self-supporting unit which requires no external brackets and which can be used on substantially all buildings regardless of latitude or the directional orientation of the building.

Another object of this invention is to provide a very efficient solar absorber. Tests indicate that the use of finned copper absorbing elements provide up to several times the amount of absorbing surface on a square foot to square foot basis as compared to flat plate collectors, without the need for added baffles to prevent internal convection.

In the modified form of my invention the heat absorbing elements are pressed waterway bonded copper, aluminum or stainless steel or alternatively are made of copper tubing bonded to copper or aluminum heat transfer flat surfaces. Panels of these absorbing elements can be manufactured ready to install and have been found to be easy to handle and efficient.

Another object of this invention is to provide a solar absorber which is relatively easy to mount and to maintain.

These and various other objects and advantages of this invention will be more fully apparent from a consideration of the following description, drawings and appended claims.

BRIEF DESCRIPTION OF THE DRAWINGS

FIG. 8 is a perspective view of a modified version of this invention showing the device mounted on a house having a peaked roof.

FIG. 9 is a perspective view of a modified version of the invention showing it mounted on a house having a flat roof.

FIG. 10 is a top plan view of the device shown in FIG. 8.

DESCRIPTION OF THE PREFERRED EMBODIMENTS

Figure 1:
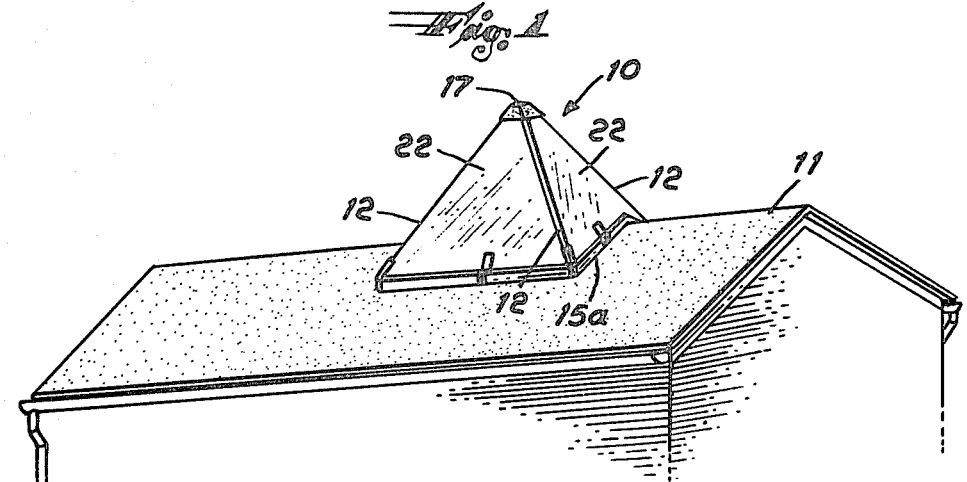
FIG. 1 is a perspective view of the hot water solar absorber according to this invention showing the device mounted on a house having a peaked roof.

Referring now specifically to the drawings, the numeral 10 designates the heat absorber. The heat absorber is constructed by connecting a plurality of heat absorber elements 13 to form a triangular shaped lateral face 14 or panel extending upwardly from a base 15. A plurality of triangular faces 14 are connected along their upward extending or lateral edges 12 by a flashing strip 16 to form a pyramid having an upward extending vertex 17.

Figure 4:
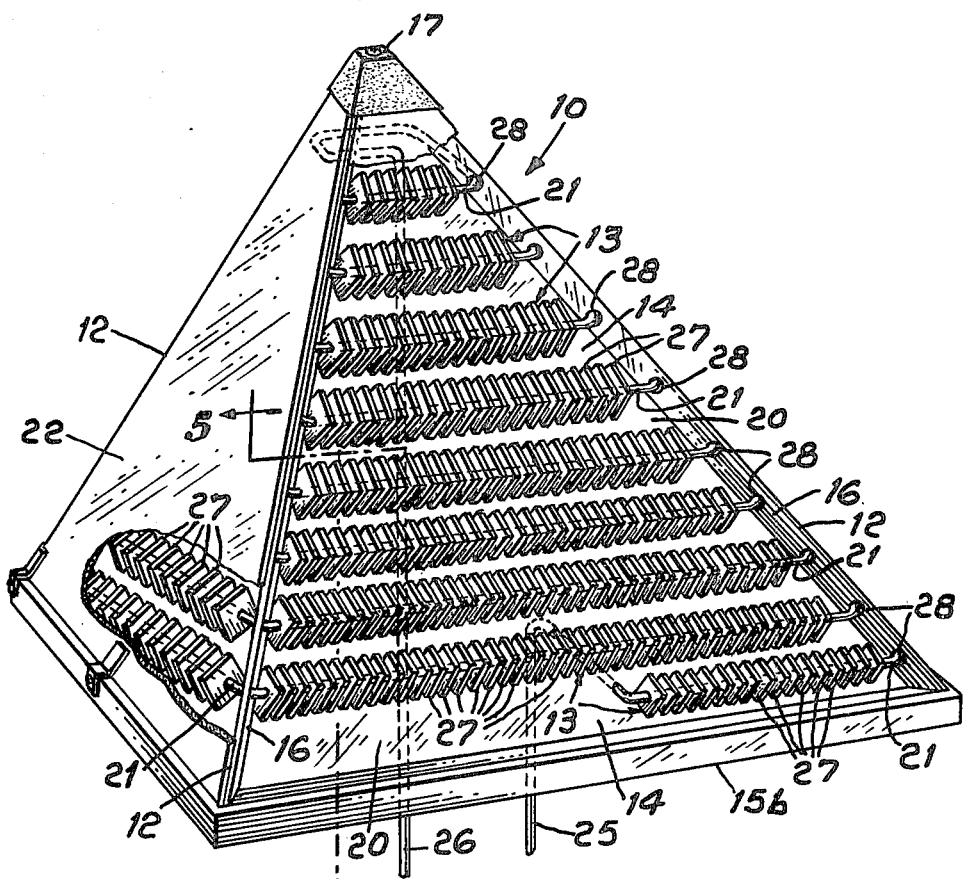
FIG. 4 is a side perspective view of the absorber showing the placement of the absorbing elements.
Figure 5:
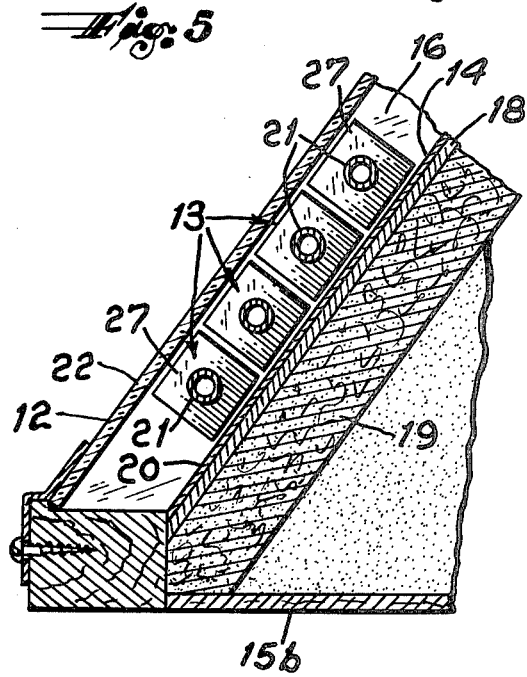
FIG. 5 is a sectional view taken on line 5—5 of FIG. 4.

A typical absorber panel 14 is shown in FIG. 4. A sectional view of a part of a typical absorber panel 14 is shown in FIG. 5. A sheet of plywood 18 is covered with a sheet of foam insulating material 19 on its inside face. The outer surface of the plywood sheet is covered with sheet aluminum 20. The absorber elements 13 are mounted on the outer face of the sheet aluminum 20. The absorber elements 13 may be constructed of finned copper, pressed copper or stainless steel tubing or they may be made by using teflon baffles over aluminum, copper or stainless steel tubing. In FIG. 5 the copper tubing is indicated by numeral 21 and the fins by numeral 27. The absorber elements 13 are then covered with a protective sheet 22 made of glass, double glass, plastic, teflon or fiberglass. The absorber elements 13 and the sheet aluminum 20 are sprayed with an absorption enhancing coating such as 3M Nextel or an equivalent spray coating (not shown in drawings).

The absorber panel shown in FIG. 5 may be constructed with ½" (1.2 cm.) plywood sheet, 1½" (3.7 cm.) foam insulation, and ¾" (2 cm.) copper convector aluminum finned tubes, although it is obvious that other sizes may be used with satisfactory results.

In testing various absorber elements, it has been found that when using finned copper absorber elements, convection under the glass is greatly reduced, thus preventing re-radiation on a side not receiving the direct rays of the sun. An advantage of using a finned tube absorber element is that a great number of fins will always be facing the sun's direct angle and there will not be as much of a re-radiating effect as from a flat surface in the morning and evening.

Figure 3:
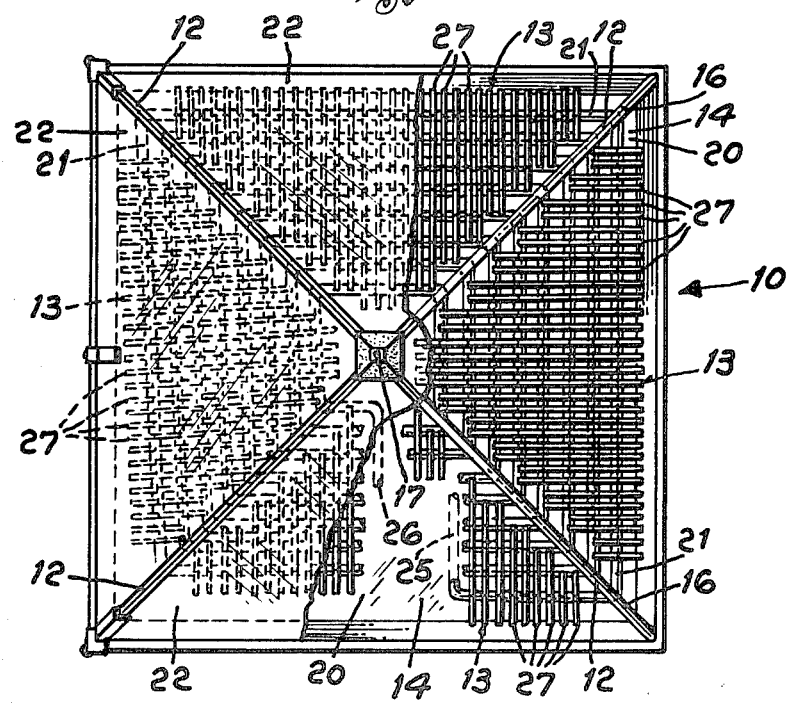
FIG. 3 is a top plan view.

The tubes 21 of the absorber element 13 are connected in series at the lateral edges 12 of the triangular panel faces 14 by pipe elbows (not shown) to form a continuous run of tubing from the lower part of the pyramid to an area near the vertex 17, as shown in FIG. 3. The pipe elbows pass through holes 28 formed in the flashing strips 16 mounted on the lateral edges of the panel faces. The flashing 16 is also used to support the protective sheets 22 of glass, plastic, teflon or fiberglass which cover the absorber elements 13.

Figure 11:
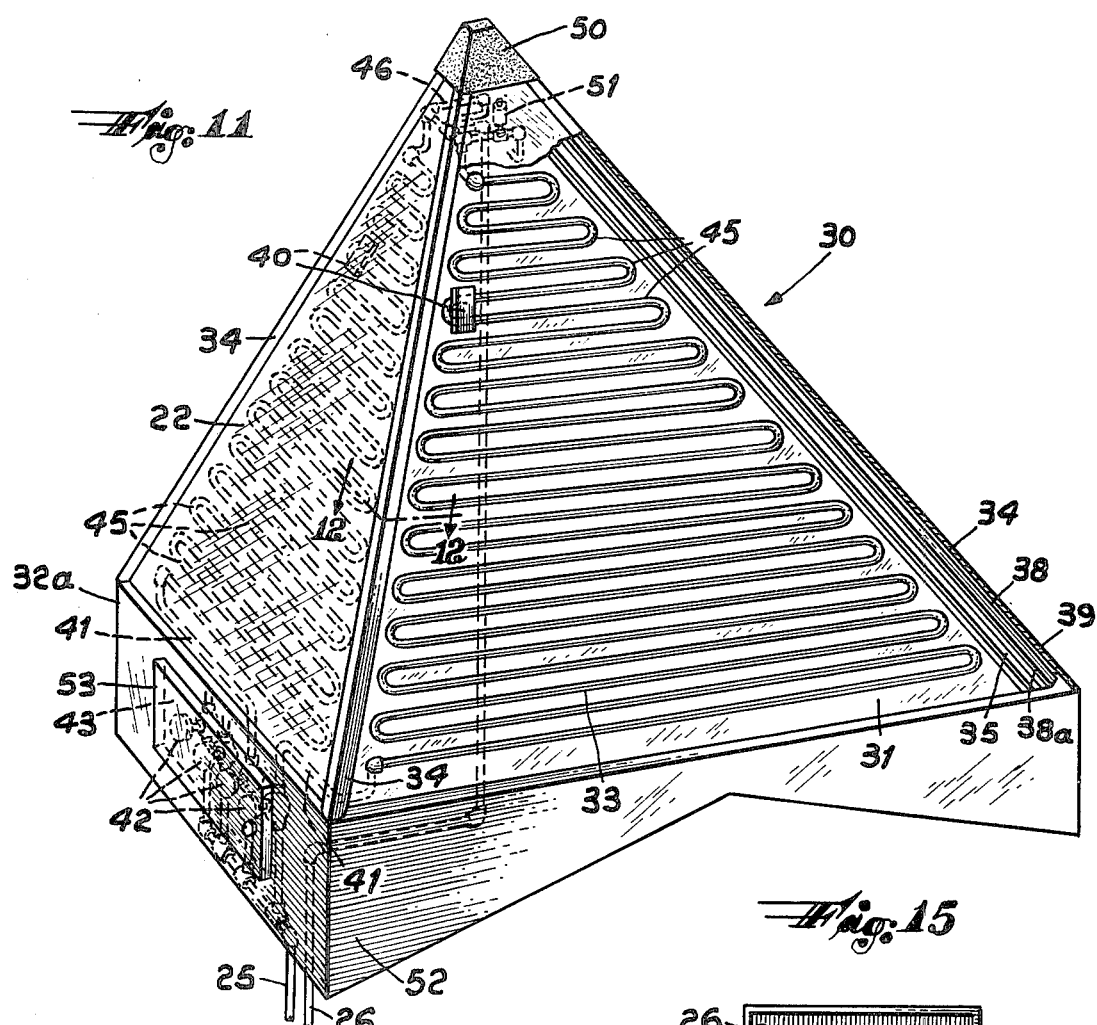
FIG. 11 is a side perspective view of the device shown in FIG. 8.

The absorber elements 13 are connected to a cold water inlet pipe 25 and a hot water outlet pipe 26 by well known plumbing techniques, with a heat sensor electrically connected to open the cold water valve and to activate a water circulator, the hot water thereafter being pumped into a storage tank or heating system for house heating or domestic hot water. A standard type air eliminator 51 is mounted in the hot water line toward the top of the pyramid (shown in FIG. 11).

A plurality of heat absorber elements 13 as described are formed and arranged in predetermined sizes to form a triangular lateral face 14 or panel when connected, a plurality of such lateral faces being arranged and connected to form a pyramid. The device shown in the drawings, which is my preferred form, is a four sided or quadrilateral regular pyramid, all of the lateral faces being congruent isosceles triangles. However, it is obvious that the device can be constructed with three or more equal lateral faces or it may be formed with three or more faces having lateral edges of unequal length to form a pyramid which tilts toward a predetermined desired direction.

The size of the faces of the pyramid will vary according to the requirements of the dwelling. Further, the angles formed by the lateral edges of the pyramid may vary with the latitude in which the device will be used, but generally the base angles of the pyramid will be approximately 51 degrees.

Figure 2:
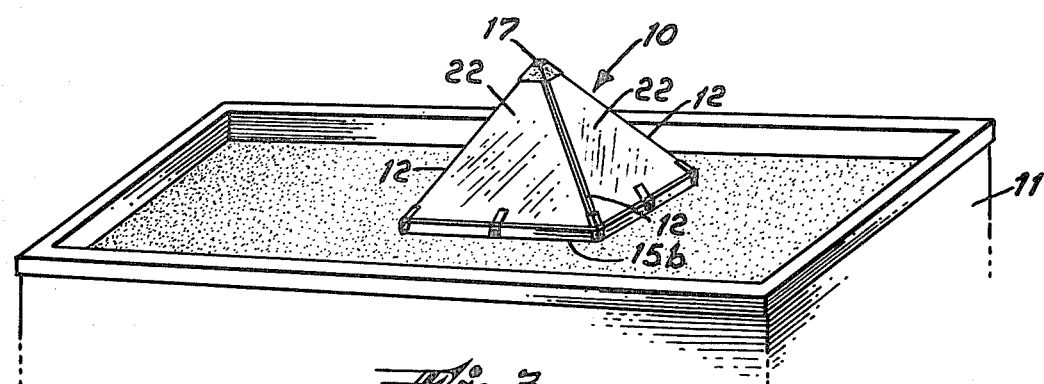
FIG. 2 is a perspective view of the invention showing it mounted on a house having a flat roof.
Figure 6:
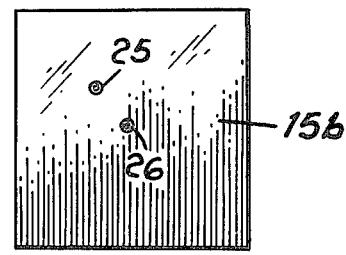
FIG. 6 is a bottom plan view of the base of the absorber designed for use on flat roofs.
Figure 7:
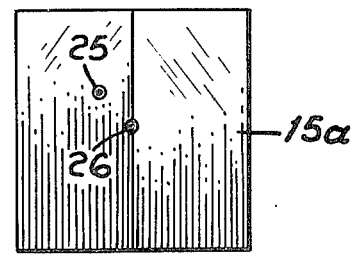
FIG. 7 is a bottom plan view of the base of the absorber designed for use on peaked roofs.

The base 15 of the pyramid is formed to fit the configuration of the roof of the building 11 on which the solar absorber will be placed. As shown in FIG. 1, the base 15a is wedge-shaped to fit onto a peaked roof, the angle of the wedge depending on the shape of the roof. Foam rubber can be attached to the edges of the wedge-shaped base to provide a unit which can be mounted on peaked tile roofs. Heretofore it has been practically impossible to mount a solar heater on a peaked tile roof. A plan view of an equilateral wedge is shown in FIG. 7. The base 15b as shown in FIGS. 2 and 6 is a flat surface designed to rest on flat roofs. In either case, after the device is hoisted onto the roof of a building it is affixed in place by brackets which are not shown in the drawings.

A modified version of my invention is shown in FIGS. 8 through 14, where the numeral 30 designates the modified heat absorber and with similar parts identified by the same numerals as above. Preformed triangular shaped heat absorber panels 31 of predetermined size, extend upwardly from a base 32 having side walls 52 which are mitered to conform to the contours of a roof of a building 11.

Figure 12:
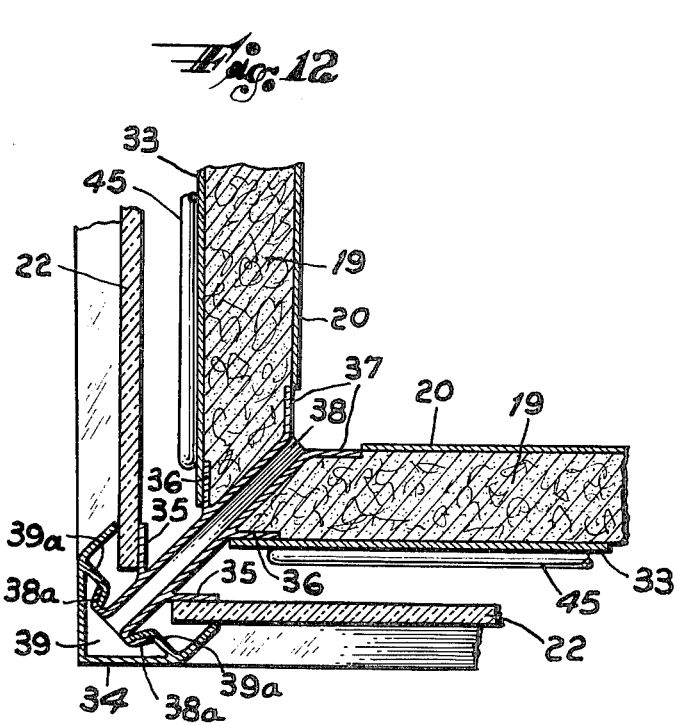
FIG. 12 is a sectional view taken on line 12—12 of FIG. 11.

A sectional view of a part of a typical absorber panel 31 is shown in FIG. 12. The heat absorbing elements 33 are triangular sheets preformed to have water lines running through a flat heat transfer surface, such as pressed waterway bonded copper, aluminum or stainless steel or alternatively copper tubing bonded to copper or aluminum heat transfer flat surfaces. In the drawings, the pressed or bonded tubing or waterway is indicated by the numeral 45. Each obsorber element 33 is covered on the outer face with a protective heat transmitting sheet 22 made of glass, double glass, plastic, teflon or fiberglass. The protective sheet may be transparent or translucent and tinted. Each absorber element 33 is backed by a sheet of insulation material 19 such as 1½ inch (3.7 cm.) foam insulation, which is backed by a sheet of aluminum 20.

The components of the heat absorber panel 31 are connected along their upwardly extending or lateral edges 12 by a slide down corner locking extrusion 34 having a corner strip 39 formed with inward facing projections 39a at the ends and a center support 38 formed with two outward facing projections 38a at the forward end, the corner projections and center support projections being formed to interlock. Three pairs of separate extrusions 35, 36, 37 extend outwardly from the center support at a predetermined angle to form three pairs of channels into which the lateral edges of two sheets of protective material 22, absorber elements 33 and the insulation 19 backed by aluminum sheeting 20 are fitted, respectively. As is well known in the art, the projections 39a of the corner strips 39 are interlocked with the projections 38a of the center support 38, bringing together two panels with the corner strip forming the angle corner of each lateral edge of the pyramid.

A heat sensor 40 is operably mounted in the face of each absorber element 33. The lower end of the copper water heating tubing in each heat absorbing element 33 is connected to its own cold water line 41 which in turn is connected to a zone water valve 42 located in a control panel 43 installed in one side wall 52 of the base 32 of the heat absorber. Each heat sensor 40 is electrically connected through a control panel 43 to one water valve 42 and to a water circulator 44. When the sun hits an absorber panel 31 the heat sensor 40 operates to open both the water valve 42 controlling the water flow to the particular panel and the water circulator 44. Cold water passes through the copper tubing or waterways 45 of the heat absorbing elements 33 and warm water is collected at the point near the top of the pyramid in a hot water collection pipe 46 or manifold which is connected in series to the waterway lines 45 of the other heat absorber elements. The hot water then drains down through a single hot water outlet line 26 to a storage tank 48. The process is shown schematically in FIG. 13 wherein electrical connections are indicated by the numeral 49.

An air eliminator 51 is mounted in the hot water collection pipe 46 and functions to vent any air that is in the water lines.

It has been found that for a four sided heat absorber, four 24 volt zone valves and a 1/20th horsepower circulating pump operate in a satisfactory manner.

The independent operation of each heat absorbing panel increases the efficiency of the heat absorber as water is not being pumped through a panel which is not being warmed by the sun, where the warm water would tend to lose some of its heat. When the sun is high in the sky, all of the heat sensors would be activated and all the panels will operate. When the sun is low in the sky, the heat sensor in the shade cuts out and closes the water valve to the shaded panel. The water circulator operates until the last sensor cuts off.

The vertex of the absorber panels is cut off to form an opening 54 at the top of the pyramid which is covered with a removable metal cap 50, preferably made of aluminum. The cap 50 can be removed to gain access to the piping inside the pyramid.

Figure 15:
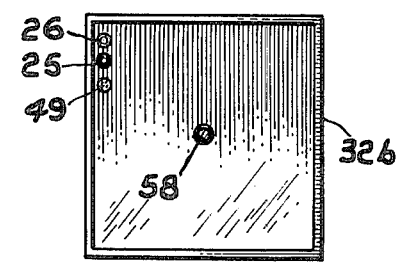
FIG. 15 is a bottom plan view of the device shown in FIG. 8 designed for use on flat roofs.
Figure 16:
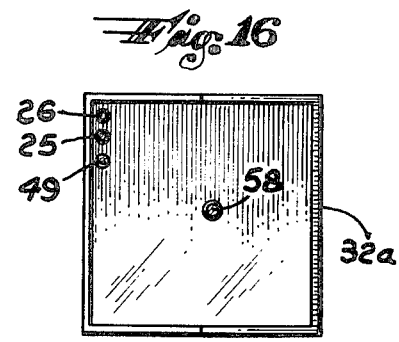
FIG. 16 is a bottom plan view of the device shown in FIG. 8 designed for use on peaked roofs.
Figure 13:
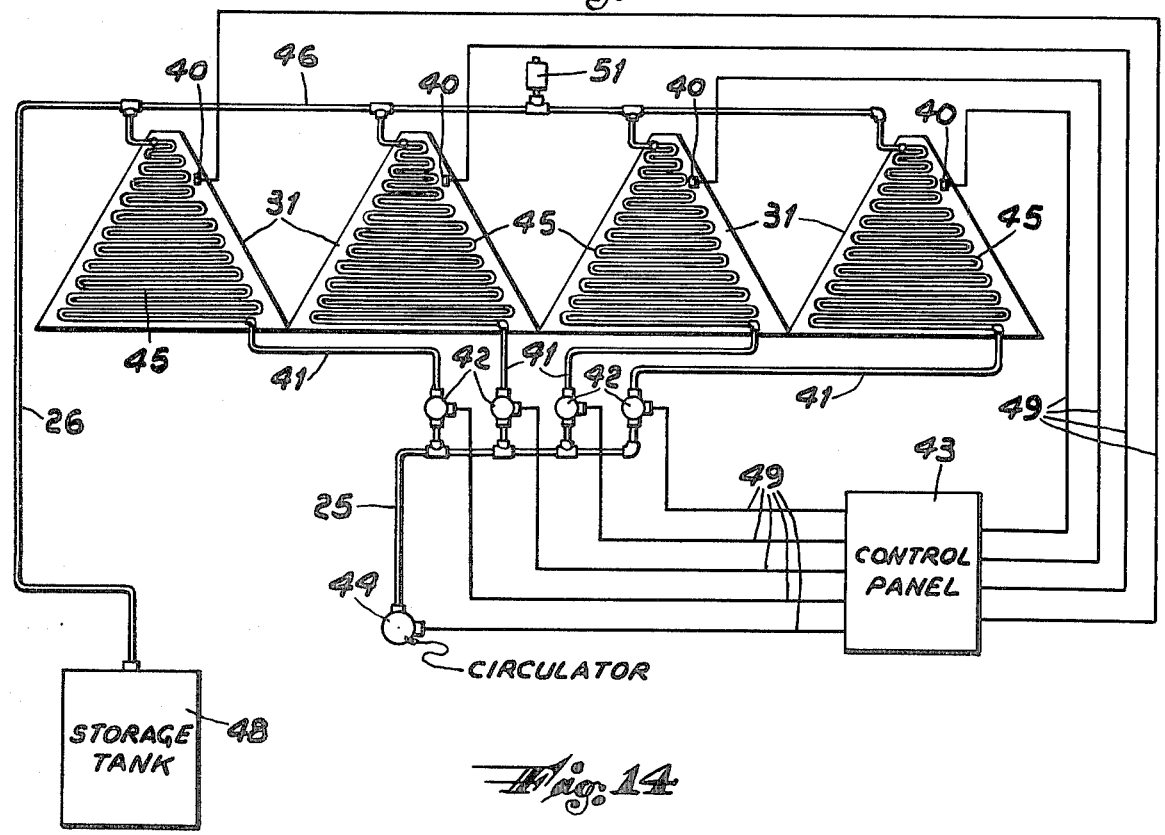
FIG. 13 is a schematic diagram of the heat sensor electrical connections and water line connections of the device shown in FIG. 8.

The base 32 of the pyramid has side walls and an open top to which the absorber panels are attached by clips (not shown). The bottom of the base can be flat 32a or wedge shaped 32-b as described above and as shown in perspective in FIGS. 8 and 9 and in plan view in FIGS. 15 and 16. My preferred form is a square base and a four sided regular pyramid, but as discussed above the device may be constructed in other ways.

A control box or panel 43, which is installed in one of the side walls 52 of the base, contains all of the water and electrical connections. All of the plumbing and electrical connections are concealed. The panel has a door 53 to protect the valves and electrical connections. In practice, the control panel is installed and all inside piping done with the exception of the last panel. The final connections are then made at the control panel and through the removable cap.

Figure 14:
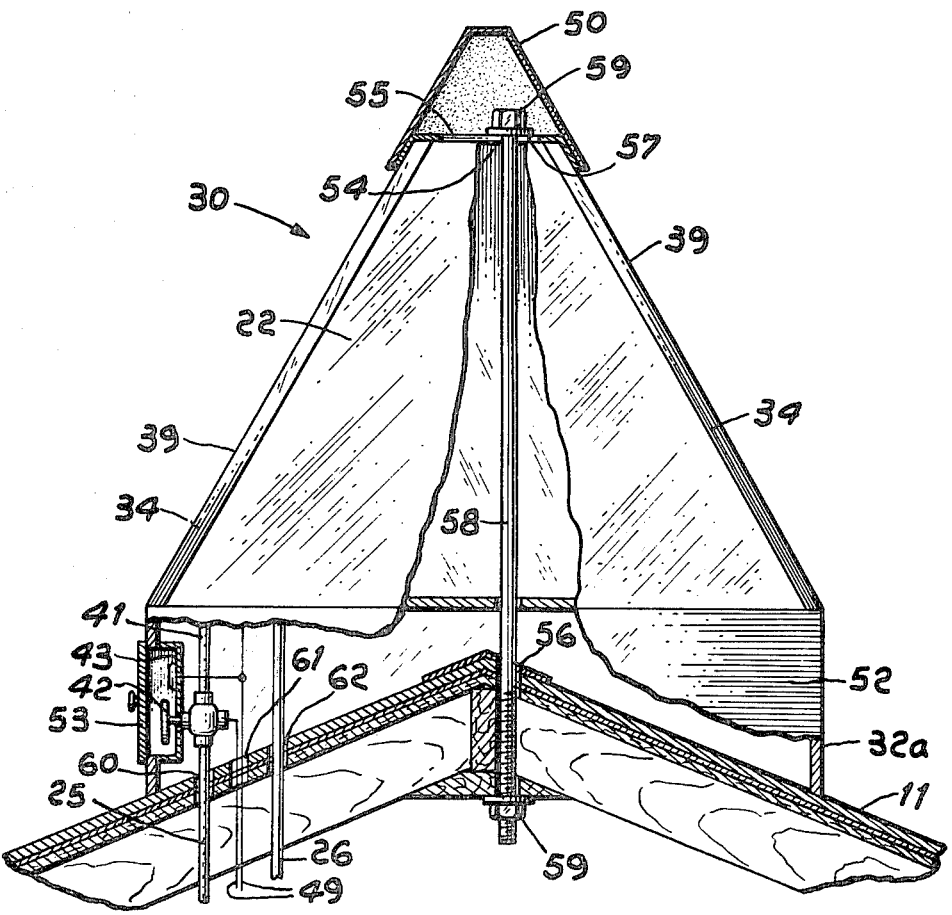
FIG. 14 is a sectional view of the device shown in FIG. 8 showing the attachment to the roof of a building.

The modified device is very simple to install, as shown in FIG. 14. A metal plate 55 is mounted across the opening 54 at the top of the absorber panels 31. Matching holes 56, 57 are drilled through the roof of a house 11 and the metal plate 55, respectively. A long threaded rod 58 is passed through the roof 11 and metal plate 55 and the threaded rod is fastened in place by standard means, such as a stud plate, washer and nut, shown generally by the numberal 59. Three other openings are drilled through the roof, namely an opening 60 for the passage of the cold water line 25, an opening 61 for the passage of the electrical lines 49 and an opening 62 for the passage of the hot water outlet 26. The same method can be used for flat or pitched roofs.

It will thus be seen that I have provided a new and improved all directional, hot water solar absorber.

I claim:

1. A pyramidal water solar absorber comprising:
   (a) a base having upwardly extending side walls;
   (b) a plurality of triangular panels extending upwardly from the base, the panels forming the lateral faces of a pyramid, the pyramid having an opening at its vertex, said panels being formed in predetermined sizes, each panel comprising:
      (1) an outer layer of heat transmitting protective material;
      (2) a middle layer of heat absorber elements having water heating tubing in contact with a metal heat transfer surface;
      (3) an inner layer of insulation material.
   (c) connecting means to attach the lateral edges of the panels;
   (d) a metal cap removably mounted on the vertex of the pyramid;
   (e) a heat sensor operably mounted in each panel;
   (f) a cold water supply line;
   (g) a plurality of electrically operated water valves;
   (h) a plurality of cold water connection pipes, leading from the cold water supply line into each water valve and out of each water valve to the lower end of the water heating tubing of an absorber element, each absorber element being connected to its own water valve;
   (i) a water circulating pump, each heat sensor being electrically connected to a water valve and to the water circulating pump;
   (j) a hot water collection pipe connected in series to the upper ends of the water heating tubing;
   (k) an air eliminator mounted in the hot water collection pipe;
   (l) a hot water outlet pipe leading from the hot water collection pipe to storage.

2. A solar absorber as set out in claim 1 where the bottom of the base is a flat surface.

3. A solar absorber as set out in claim 1 where the bottom of the base is in the form of a wedge.

4. A solar absorber as set out in claim 1 where all the lateral faces of the pyramid are congruent isosceles triangles.

5. A solar absorber as set out in claim 4 where the pyramid has four lateral faces.

6. A solar absorber as set out in claim 5 where the base angles of the lateral faces are approximately fifty-one degrees.

7. A solar absorber as set out in claim 1 where the heat transmitting protective material is selected from a group consisting of glass, double glass, plastic, teflon or fiberglass.

8. A solar absorber as set out in claim 1 where the heat absorber elements are pressed waterway bonded metal, wherein the metal is copper, aluminum, or stainless steel.

9. A solar absorber as set out in claim 1 where the heat absorber elements are copper tubing bonded to metal heat transfer flat surfaces, wherein the metal is copper or aluminum.

10. A solar absorber as set out in claim 1 where a control panel is mounted in a side of the base to contain all water and electrical connections.

* * * * *